United States Patent [19]
Haluda et al.

[11] 3,887,037
[45] June 3, 1975

[54] LUBRICATION SYSTEM FOR DIFFERENTIALS

[75] Inventors: Raymond P. Haluda, South Bend, Ind.; Kenneth W. Nelson, Niles, Mich.

[73] Assignee: Clark Equipment Company, Buchanan, Mich.

[22] Filed: Mar. 20, 1974

[21] Appl. No.: 452,872

[52] U.S. Cl. ......... 184/6.12; 180/24.11; 180/73 R; 184/11 A
[51] Int. Cl. ............................. F01m 9/12
[58] Field of Search ..... 184/6.12, 10 R, 11 R, 11 A, 184/11 B, 14, 13 R; 180/24.05, 24.09, 22, 24.11, 24.12

[56] References Cited
UNITED STATES PATENTS

| | | | |
|---|---|---|---|
| 1,631,217 | 6/1927 | Matthews | 184/13 R |
| 2,015,108 | 9/1935 | Harper | 184/11 R |
| 2,368,963 | 2/1945 | Boden | 184/11 R |
| 2,870,854 | 1/1959 | Keese | 184/6.12 X |
| 2,935,889 | 5/1960 | Adams et al. | 184/6.12 X |
| 3,182,527 | 5/1965 | Bryan | 184/11 RX |
| 3,532,183 | 10/1970 | Shealy | 184/13 RX |
| 3,741,343 | 6/1973 | Lindenfeld et al. | 184/6.12 X |
| 3,771,622 | 11/1973 | Hyakumura | 184/11 A |
| 3,825,099 | 7/1974 | Hopf | 184/6.12 |
| 3,838,751 | 10/1974 | Brown | 184/6.12 |

FOREIGN PATENTS OR APPLICATIONS
743,027   1/1956   United Kingdom ............. 180/24.09

*Primary Examiner*—Richard C. Pinkham
*Assistant Examiner*—Arnold W. Kramer
*Attorney, Agent, or Firm*—Ernst H. Ruf

[57] ABSTRACT

In single and multiple axle assemblies wherein each axle assembly has an axle differential and wherein preferably at least one axle assembly of the multiple axle assemblies also has an interaxle differential, an improved lubrication system for the axle and/or the interaxle differentials, the improved lubrication system including a separate lubricant reservoir in the axle housing substantially completely above the lubricant level of the sump, first and second lubricant collection channel means leading into the reservoir and fed by the pinion and ring gears, and first and/or second lubricating passage means for the axle and/or interaxle differentials respectively, leading from the reservoir, wherein the lubricant flow is solely by gravity pressure from the reservoir thereby permitting lubrication of the differential(s) even though located entirely above the normal axle lubricant sump level.

18 Claims, 8 Drawing Figures

LUBRICATION SYSTEM FOR DIFFERENTIALS

BACKGROUND OF THE INVENTION

1. Field of the Invention

The field of art to which this invention pertains includes single and multiple axle assemblies wherein each axle assembly has an axle differential and wherein preferably at least one axle assembly of the multiple axle assemblies also has an interaxle differential; more specifically, a lubrication system for the axle and/or interaxle differentials.

2 Description of the Prior Art

This invention relates to the lubrication of axle differential mechanisms such as are employed in vehicle final drives to divide and transmit torque to the driving wheels of a vehicle. It also relates to the lubrication of interaxle differentials that are used to divide and transmit torque to the several axles of a multiple axle vehicle. The various gears and other components of each such differential mechanism must be cooled and lubricated at all times during the mechanism's operation by an adequate flow of lubricant and typically such flow is accomplished by sealing the rotating carrier of the differential within a housing partially filled with lubricant so that the rotation of the carrier may be employed to circulate the lubricant.

The design of such lubrication systems usually takes one of two forms, depending upon the intended use as well as the expected normal rotating speed of the differential carrier. If the carrier is to be normally operated at relatively high rotative speeds it is common to supply oil to the carrier near its axis of rotation so that centrifugal forces may be utilized to supply lubricant to the carrier's internal components. However, if the carrier is to be normally operated at relatively low rotative speeds it is common to use gravity flow passages to supply lubricant to the carrier's internal components.

It is an object of the present invention to provide a lubrication system for axle and/or interaxle differentials which provides an adequate supply of lubricating fluid to the internal components thereof at both high and low speeds and even though these differentials are located entirely above and/or remote from the normal axle lubricant sump level.

SUMMARY OF THE INVENTION

The improved lubrication system of this invention for axle differentials includes a lubricant sump that essentially covers the entire bottom portion of the axle differential and the lubricant level therein is such that the ring and pinion gears rotate therethough and thus carry lubricant upwardly to separate ledge or stripper portions preferably integral with the axle housing. These stripper portions tend to scrape lubricant from the pinion and ring gears and direct this lubricant via channels in the axle housing to a separate reservoir which is higher than and substantially entirely above the normal lubricant sump level. One of the axle shafts projects through the reservoir and is in substantial sealing relationship with the reservoir at its exit area from the reservoir. Once the reservoir is filled, lubricant proceeds to flow from the reservoir into the axle differential by way of a first lubricating passage means commencing in the entrance area of the axle shaft into the reservoir. The lubricant flows into the axle differential solely by gravity pressure, thereby permitting lubrication of the axle differential even though it is located entirely above the normal axle lubricant sump level.

The improved lubrication system of this invention for interaxle differentials is preferably utilized on axle assemblies of the type having a hypoid bevel gear drive with greater-than-normal pinion vertical offset (with reference to the ring gear center line) so that the output shaft of the interaxle differential can cross the axle shaft without interference. This configuration is used with an interaxle differential by running the interaxle output shaft through the center of a hollow axle pinion shaft, thereby keeping the pinion and output shafts concentric. The improved lubrication system for interaxle differentials includes the same structural components previously described with reference to the improved lubrication system for axle differentials with the addition that the interaxle output shaft also projects through the reservoir and is also in substantial sealing relationship with the reservoir at its exit area from the reservoir. Furthermore, a second lubricating passage means is provided for the interaxle differential from the reservoir and commmences in the entrance area of the interaxle differential output shaft into the reservoir and extends between the output shaft and the hollow hypoid pinion gear shaft into the interaxle differential. The lubricant flow into the interaxle differential again is solely by gravity pressure and permits the lubrication of the interaxle differential although it is wholly remote from the axle sump. It should, of course, be realized that if only interaxle differential lubrication is desired, then the first lubricating passage means into the axle differential is merely deleted by having a sealing relationship between the axle shaft and the reservoir at the former's entrance area into the reservoir.

Thus, the use of a separate reservoir that is much higher than the sump provides a hydraulic head for lubricating either and/or both the axle and interaxle differentials. A similar type of construction may be used with others of the multiple axles except, of course, that no interaxle differential needs to be lubricated. It should also be understood that if only axle differentials need to be lubricated that any desired type of differential gear drive may be utilized since the previously-described hypoid gear drive is specific to the improved lubrication system for an axle assembly with both axle and interaxle differentials.

The improved lubrication system of this invention also includes first and second lubricant collection channel means which in turn include first and second stripper edges closely adjacent to the rotating gear teeth of the ring and pinion gears respectively. These lubricant channel means are substantially downwardly converging from the first and second stripper edges respectively and terminate into a top portion of the reservoir thereby channeling the stripped lubricant into the reservoir.

Further objects, features and advantages of the invention will become more readily understood by persons skilled in the art when following the detailed description in conjunction with the drawings.

DESCRIPTION OF THE PREFERRED EMBODIMENTS

Figure 1:
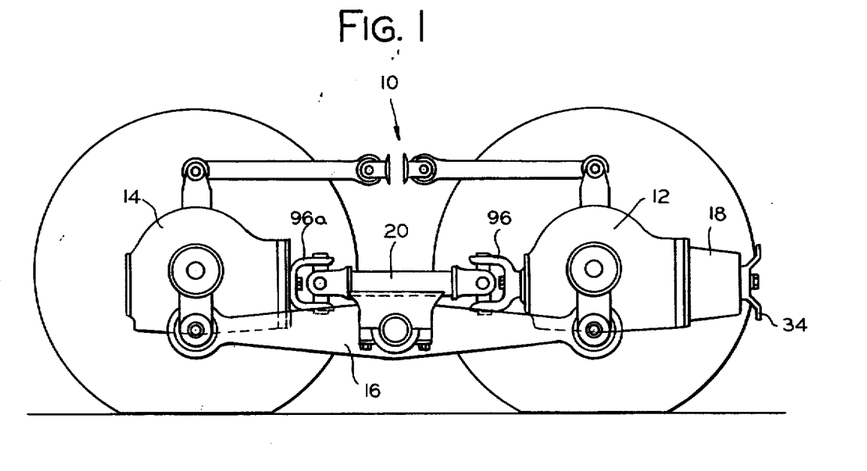
FIG. 1 is a side elevational view of a dual drive or tandem axle assembly embodying the lubrication system for differentials of this invention.

Referring now to the drawings, particularly FIG. 1, the reference numeral 10 generally denotes a dual or tandem axle drive assembly for use with trucks, tractors, busses and the like. Assembly 10 includes an axle 12 close to the prime mover and an axle 14 remote from the prime mover. Axles 12 and 14 are connected to the associated chassis by means of any type of desired suspension system 16. The power to drive assembly 10 is supplied from a prime mover (not shown) to an interaxle differential 18 which divides the power between axles 12 and 14, with axle 14 being connected to differential 18 by means of a shaft 20.

Figure 2:
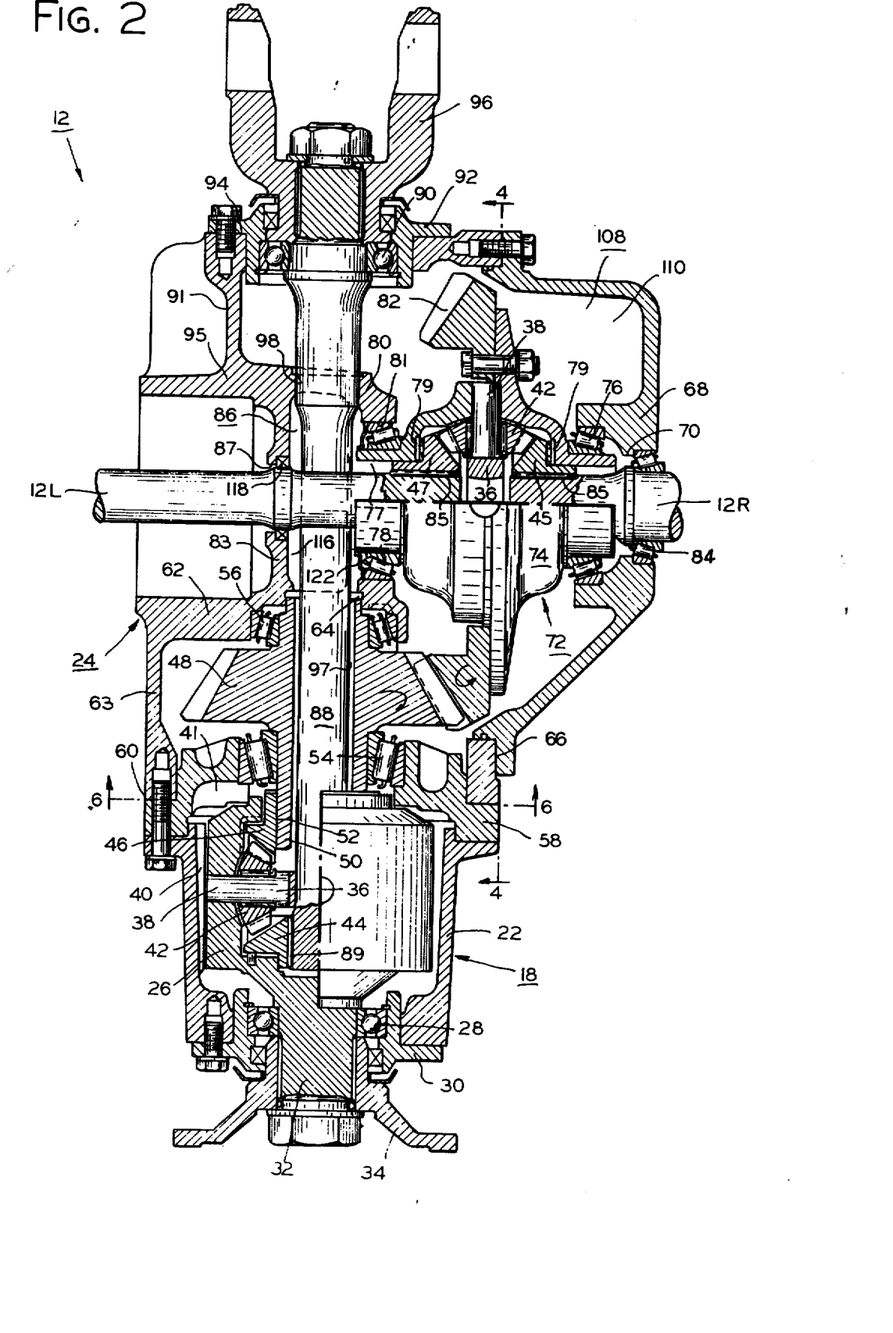
FIG. 2 is a transverse, partially sectional top view of the axle closest to the prime mover.

Referring now to FIG. 2, interaxle differential 18 includes a housing 22 connected to axle housing 24 of axle 12. Interaxle differential 18 is of a conventional bevel-gear type and includes a case or carrier 26 which is mounted for rotation in housing 22 by means of a bearing 28 which in turn is secured in a bearing-and-seal retainer 30 that is attached to the outer end of interaxle differential housing 22. Integral with carrier 26 is an input shaft 32 which is adapted to be connected to the prime mover, via splined flange 34 so that carrier 26 can be driven. Carrier 26 preferably is made in two pieces which are held together by a plurality of nut and bolt assemblies (not shown), the two pieces having clamped therebetween a cross or spider 36. Cross 36 includes a plurality of shafts 38, on each one of which a pinion gear 42 is mounted for rotation thereon. Disposed on each side of gears 42, and mounted for rotation within carrier 26, are side gears 44 and 46, both of which mesh with each pinion gear 42, as shown.

Power supplied to interaxle differential 18, by the prime mover, is divided, according to the requirements of axle 12 and axle 14, between side gears 44 and 46. Power is transmitted from side gear 46 to axle 12 via hollow pinion shaft 50 which may be integral with hollow pinion gear 48. Hollow pinion shaft 50 is splined to side gear 46 at 52 and is mounted for rotation in bearings 54 and 56. Bearing 54 is supported in a bearing retainer and end wall 58 that is interposed between the inner end of interaxle differential housing 22 and an adjacent open end portion 60 of axle housing 24. Bearing 56 is held in a retainer portion 62 of axle housing 24 having a stepped bore 64. Axle housing portions 60 and 62 are connected by a closed wall portion 63.

As best seen in FIG. 2, axle housing 24 of axle 12 contains various axle and differential components and provides openings for the various shafts to be described hereinafter. An open end portion 66 of axle housing 24 has secured thereto an axle housing cover 68 having a central opening 70 therein. An axle differential 72 has its carrier 74 journaled for rotation by tapered thrust bearing 76 in axle housing cover 68 and bearing 78 retained in bore 81 of a bearing retainer portion 80 of axle housing 24. A ring gear 82, driven by pinion gear 48, is connected to rotate differential carrier 74 about its axis of rotation as defined by bearings 76 and 78.

Axle differential 72, similar to interaxle differential 18, is again of a conventional bevel-gear type and its carrier 74 preferably is made in two pieces which are held together by a plurality of nut and bolt assemblies (not shown), the two pieces having clamped between them a cross 36 which includes a plurality of shafts 38 on each one of which pinion gear 42 is mounted for rotation. As previously described with reference to interaxle differential 18, disposed on each side of gears 42, and mounted for rotation within the carrier, are side gears 45 and 47 which, although slightly different in shape from side gears 44 and 46 perform the same function and mesh with gear 42, as shown. Drive axle 12R which extends into differential carrier 74 through central opening 70 in axle housing cover 68, is journaled by bearing 84 and is splined, as at 85, for conjoint rotation with side gear 45. Axle shaft 12L extends into differential carrier 74 through a bore 87 in an axle shaft end wall portion 83 of axle housing 24 and also extends into and through a reservoir 86 (to be described hereinafter). Shaft 12L is splined, as at 85, for conjoint rotation with side gear 47.

Interaxle differential 18, in addition to driving hollow pinion shaft 50 via side gear 46, also drives an output shaft 88 splined to side gear 44 and 89 and journaled for rotation by bearing 90. Bearing 90, in turn, is held by a bearing-and-seal retainer 92 attached to an open-end portion 94 of axle housing 24. A splined flange 96, which is operatively connected to the outer end of output shaft 88, is connected to one end of shaft 20 (FIG. 1) that serves to drive axle 14.

It should be noted at this time that output shaft 88 is concentric with hollow pinion gear 48 and passes freely through it as well as hollow pinion shaft 50 with an annular bore 97 remaining between shaft 88 and shaft 50. Furthermore, shaft 88 also passes through bore 64 in axle housing bearing retainer portion 62 and an opening 98 in axle housing portion 95 in the interior of axle housing 24. Axle housing portions 94 and 95 are connected by closed end wall portion 91. Annular bore 97 merges into bore 64 on its inner end and into the center of interaxle differential 18 on its outer end.

It should be noted at this time that pinion gear 48 and ring gear 82 define a hypoid gear set with a greater-than-normal pinion offset (either above or below the center line of ring gear 82) so that output shaft 88 (concentric with hollow pinion gear shaft 50) of interaxle differential 18 can cross axle shaft 12L without interference and without the need of a drop gear set. Basically, the offset between the center line of hollow pinion gear 48 and the center line of ring gear 82 is larger than the sum of the radii of axle shaft 12L and output shaft 88 (at their crossover point), i.e., so that output shaft 88 and axle shaft 12L can cross without interference.

Figure 3:
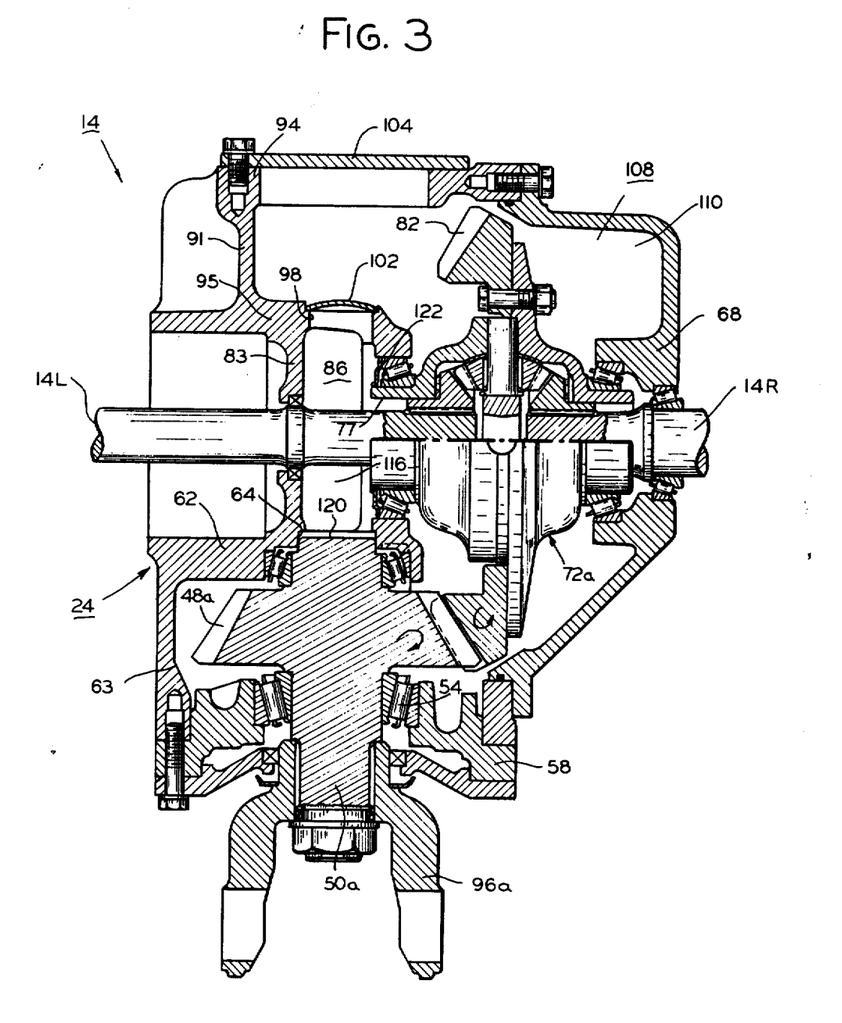
FIG. 3 is a transverse, sectional top view of the axle furtherest removed from the prime mover.

Before proceeding with a more detailed description of the lubrication system, it should also be noted that axle 14, i.e., the axle remote from the prime mover, is substantially similar to axle 12 and utilizes an identical axle housing 24. Like numerals are applied to like parts, with the basic difference between the two axles being that since no output shaft 88 is required in axle 14, neither is a hollow pinion gear 48. Thus, solid pinion gear 48a is part of solid pinion shaft 50a which is rotated by means of a splined flange 96a affixed thereto, with flange 96 being attached to the other end of shaft 20 (FIG. 1). Since shaft 88 is not required in axle 14, neither is an opening or bore 97 (as shown in FIG. 2). The inner end of solid pinion shaft 50a is substantially sealingly received in a portion of stepped bore 64 in housing bearing retainer portion 62. In addition, opening or bore 98, in axle housing portion 95, is closed by means of plug 102 and axle housing open end portion 94 is closed by means of an attached plate 104. Axle differential 72a for axle 14 is identical to differential 72 (previously described with reference to axle 12). No invention is claimed for either the differentials or the off-set hypoid bevelgear drive per se.

Axles 12 and 14 each have an irregular-shape lubrication or oil sump 108 with a bottom wall 110 and a plurality of adjoining generally vertical walls comprised of bearing retainer and end wall 58, closed wall portion 63, bearing retainer portion 62, axle shaft end wall portion 83, axle housing portion 95, closed end wall portion 91, open end portion 94, bearing-and-seal retainer 92 (axle 12) or plate 104 (axle 14) and housing cover 68. Thus, sump 108, as defined by bottom wall 110 and the previously noted wall portions, basically underlies the portions of the axles swept by ring gear 82 and pinion gear 48 (or 48a), but does not underlie interaxle differential 18. The maximum height or level of the lubricant in sump 108 is indicated by line 112 shown in FIGS. 4 and 6.

Figure 4:
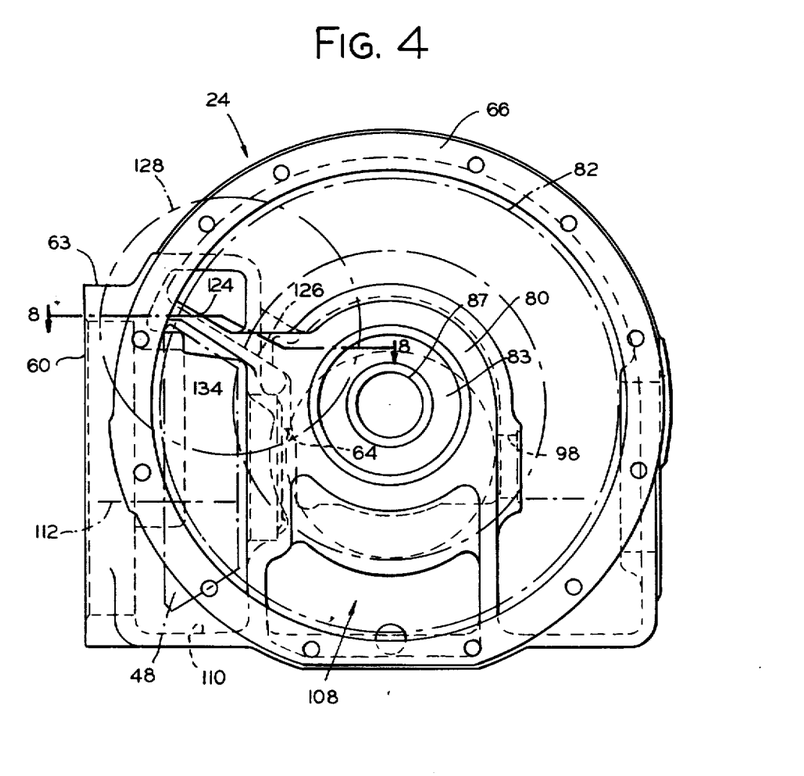
FIG. 4 is a vertical sectional view of one end of the axle housing taken along line 4—4 of FIG. 2.
Figure 6:
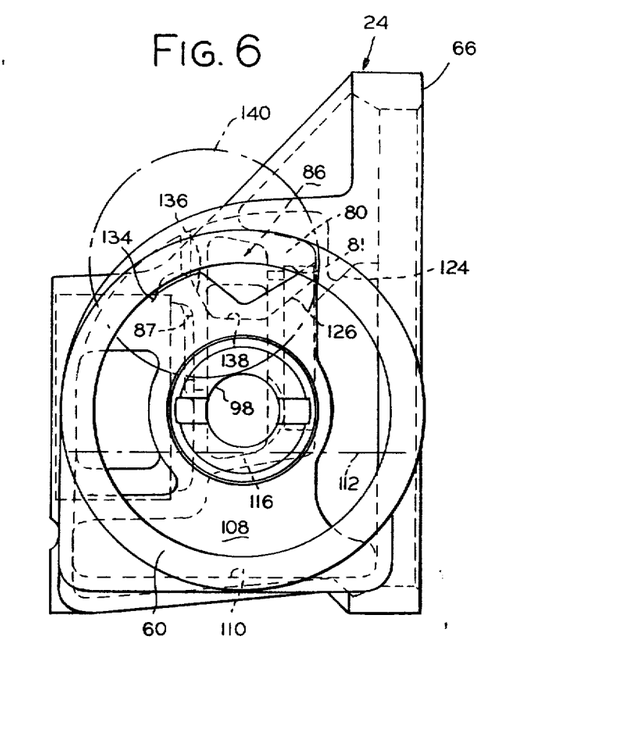
FIG. 6 is a vertical sectional view of another end of the axle housing taken along line 6—6 of FIG. 2.

As best seen in FIGS. 2, 4 and 6, reservoir 86 may be described as a deep, generally rectangular pocket that is cast into or forms a part of axle housing 24 and has a bottom wall 116 (best seen in FIG. 6) as well as generally vertically extending wall portions made up of axle housing portions 62, 83, 95 and 80. As previously noted, output shaft 88 and shaft 12L both pass through reservoir 86. The exit of lubricant from reservoir 86 is closely controlled at bore 87 (where shaft 12L passes through wall portion 83) by means of a positive rubber seal 118 and at bore 98 (where shaft 88 passes through wall portion 95) by a very close running clearance between shaft 88 and bore 98. It should of course, be noted that since axle 14 does not utilize shaft 88, bore 98 is closed by the insertion of a plug 102. Furthermore, in axle 14, the inner end portion 120 of pinion 48a is substantially sealingly received in a portion of stepped bore 64, thereby substantially preventing the escape of lubricant, at this point, from reservoir 86.

However, with reference to axle 12, as best seen in FIG. 2, bore 64 merges into annular bore 97 thereby permitting lubricant to flow between output shaft 88 and hollow pinion shaft 50 into the center of interaxle differential 18.

Both FIGS. 2 and 3 show that axle housing wall or bearing retainer portion 80, which forms one of the vertical walls of reservoir 86, has an opening or bore 81 that retains bearing 78 which in turn journals one end of carrier 74. A bearing shield 122 minimizes the leakage from reservoir 86 through bearing 78. However, lubricant is permitted to flow from reservoir 86 into differential 72 via passage or bore 77 which extends principally between the outer surface of side gear 47 and the inner surface of carrier 74, the latter having recesses or pockets 79 to permit the necessary lubricant flow. A small amount of lubricant also flows through the splines between side gear 47 and shaft 12L.

Figure 5:
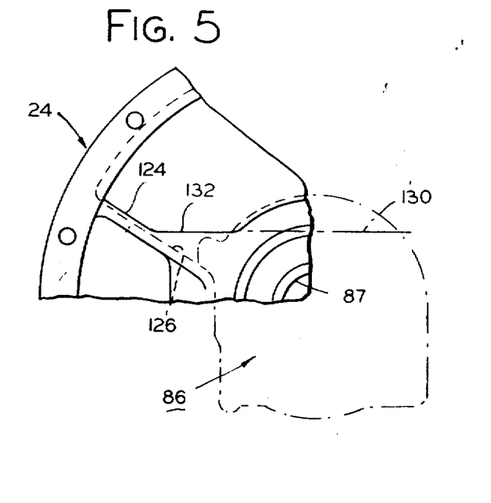
FIG. 5 is a simplified enlargement of the circled area of FIG. 4.
Figure 8:
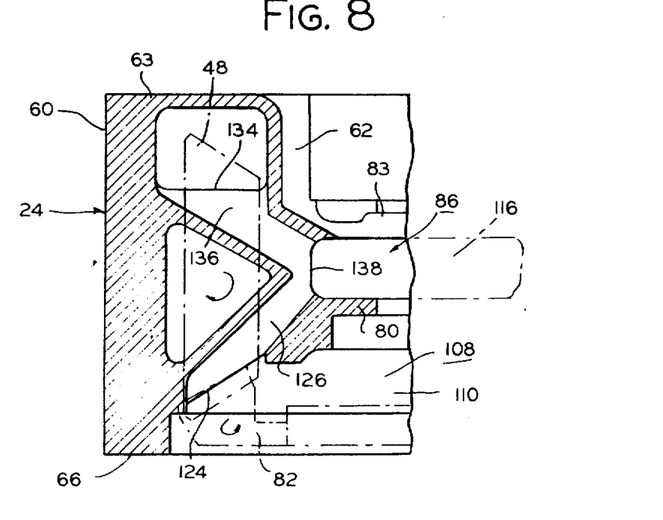
FIG. 8 is a simplified sectional view of a portion of the axle housing, taken generally along line 8—8 of FIG. 4.

FIG. 4, which is a vertical sectional view of one end of axle housing 24, as taken along 4—4 of FIG. 2, shows only axle housing 24 with all parts removed therefrom, except for the phantom line showing of pinion gear 48 and ring gear 82. An examination of FIG. 4 and reference to the maximum height of the lubricant in sump 108, as indicated by line 112, will readily show that pinion gear 48 and ring gear 82 are lubricated by running or rotating through sump 108. A portion of the lubricant contained in sump 108 clings to ring gear 82 after its emergence from sump 108. The same phenomena occurs with reference to pinion gear 48. During rotation of ring gear 82 it passes very close to a ring gear stripper edge 124. Stripper edge 124 preferably is an integral part of axle housing 24 and is located near the top of the housing and very close to the rotating gear teeth. After the lubricant is taken or stripped from rotating ring gear 82, it flows by gravity down a short channel 126 into the top reservoir 86. In order to more clearly show the location of both stripper edge 124 as well as channel 126, FIG. 5 presents a simplified enlargement of a portion of the circled area 128 shown in FIG. 4. FIG. 5 also shows the phantom outline of reservoir 86, with the maximum height or level of the lubricant in reservoir 86 being indicated by line 130. In addition, FIG. 5 shows one of the side walls 132 of channel 126 which permits, in case reservoir 86 is completely filled, the lubricant to simply overflow and fall back into sump 108, while the high level in reservoir 86 is maintained. In order to more completely understand the removal of lubricant from the ring gear teeth and its flow into reservoir 86, reference should be made to FIG. 8 which is a simplified sectional view taken generally along line 8—8 of FIG. 4. FIG. 8 also has the outlines of ring gear 82 and pinion gear 48 superimposed thereon in phantom lines, with these gear outlines, however, being shown at their horizontal center lines.

FIG. 6, which is a vertical sectional view of another end of axle housing 24, as taken along line 6—6 of FIG. 2, essentially shows axle housing 24 from the pinion gear end whereas FIG. 4 shows axle housing 24 from the ring gear end. FIG. 6 also shows ring gear stripper edge 124 as well as the bottom of channel 126 as it merges into reservoir 86.

Figure 7:
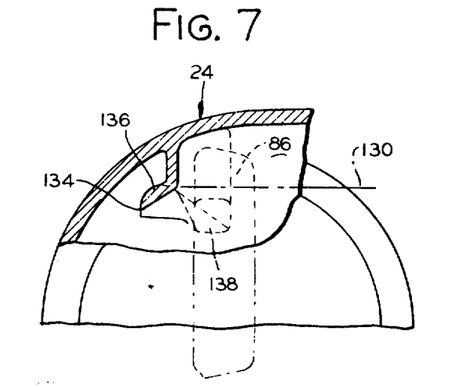
FIG. 7 is a simplified enlargement of the circled area of FIG. 6.

In a manner similar to that described with reference to ring gear 82, pinion gear 48 also has the excess lubricant, which adhers to its teeth, scraped therefrom through the use of a stationery pinion gear stripper edge 134 as best shown in FIGS. 4 and 8. Stripper edge 134 preferably forms an integral part of the axle housing and is located near the top of the housing very close to the rotating pinion gear teeth. The removed lubricant flows by gravity down a channel 136, as best seen in FIGS. 6, 7 and 8. FIG. 7 presents a simplified enlargement of a portion of the circled area 140 shown in FIG. 6, to more clearly denote the interrelationship of channel 136 and reservoir 86. Channels 126 and 136 converge and partially intersect just prior to merging into wall 138 of reservoir 86 (as best shown in FIGS. 6 and 8). It should be noted in FIGS. 6 and 7 that pinion gear stripper edge 134 can only be seen as a point or end view.

It should be clear at this time that lubricant is taken from the rotating hypoid ring and pinion gears by means of stripper edges 124, 134 and channeled via gravity and channels 126, 136 respectively, into reservoir 86. It should also be noted that reservoir 86 is substantially completely above the lubricant level of sump 108 and that stripper edges 124, 134 are so disposed as to face the normally rotating directions (as shown in the drawings) of gears 82 and 48, respectively. Furthermore there is no connection between reservoir 86 and sump 108 other than that, if reservoir 86 is completely full, the lubricant simply overflows and falls back into sump 108 while the high level in reservoir 86 is maintained.

As previously noted, all exits from reservoir 86 are blocked except for bores 77 and 97. These lubricant passages to differential 72 and interaxle differential 18 are near the bottom of reservoir 86 so that lubricant flow is forced into these passages by the gravity pressure in the lubricant itself. The lubrication system of this invention thus utilizes a deep reservoir 86 of lubricant which serves to provide lubricant at a significantly higher level than the normal lubricant level in sump 108 of the axle and, since the lubricant level in the reservoir is thus significantly higher than the passages into the several differentials, the gravity lubricant flow is established.

In the case of interaxle differential 18, lubricant flows out of reservoir 86 via bore 97 into the center of interaxle differential 18. In both of differentials 18 and 72, after the lubricant performs its lubricating function in a known manner, the greater portion thereof eventually flows out of the two differentials through passages created by machining flats on cross arms or shafts 38 where they rest in the differential cases as is well known in the art. This lubricant flow is, of course, aided by the centrifugal force imparted by rotating differential cases 26 and 74. The lubricant which escapes from differential 72 in this manner simply falls back into sump 108. The lubricant which escapes from interaxle differential 18 is carried around the outside of the differential case 26 until it reaches a stripper rib 40 at the top of the inside of interaxle differential housing 22. It should be noted that stripper rib 40, as shown in FIG. 2, is approximately 90° out of its true position. Stripper rib 40 strips the lubricant from the outside of case 26 and the lubricant falls by gravity through a channel 41 cast into pinion bearing retainer and end wall 58 and is pumped therefrom into sump 108 by means of bearing 54.

The lubrication system of this invention with reference to differentials 72 and 72a in FIGS. 2 and 3 respectively, makes possible the lubrication of each of these differentials even through they are located entirely above the normal lubricant sump level of their axles thus, this lubrication system allows the use of a lubricant level in the axle sump which is much lower than is normally used.

With specific reference to FIG. 2, the lubrication system of this invention also makes possible the lubrication of a differential that is wholly remote from the axle sump, such being the case with interaxle differential 18.

It should also be noted at this time that if only an axle differential needs to be lubricated, such as for example, differential 72a in FIG. 3, any desired type of differential gear drive may be utilized since the previously-described hypoid gear drive is specific to an axle assembly having both axle and interaxle differentials because the latter has lubricant flowing thereinto between the interaxle differential output shaft and the hollow hypoid pinion gear shaft.

In both axles 12 and 14 the lubricant level in sump 108 is significantly lower than in many other designs. This has several advantages in that less lubricant is required to maintain the lower fill level; the axle operates more efficiently because fewer of the rotating parts are actually immersed in the lubricant so that there is less friction with the lubricant; and the operating temperature of the lubricant is lower, again, because of less friction. In addition, the lubrication system of this invention adds no moving parts to the axle mechanism, so there are no parts to wear out or break and no maintenance is required other than periodic lubricant changes.

It should, of course, be understood that drive assemblies having other than dual or tandem axle layouts can also be utilized. For example, a single axle assembly such as axle 14 of FIG. 3 could be used. In this instance, reservoir 86 is utilized for lubricating only differential 72a (since no interaxle differential is required).

While FIGS. 1, 2 and 3 show a dual or tandem axel assembly that utilizes an interaxle differential, it is also quite feasible to have a tandem axle assembly that does not require an interaxle differential. For example, the axle closest to the prime mover could be a modified version of axle 14 which, however, would need an output shaft similar to shaft 88 of axle 14, with this output shaft preferably being splined to and concentric with pinion gear 48a. This outut shaft would be journaled in a manner similar to that shown in axle 12 in FIG. 2 and would be connected via a shaft, such as shaft 20 (FIG. 1) to an axle remote from the prime mover, such as axle 14.

Furthermore, several different triple axle configurations could also be readily assembled, one example of which could utilize the just previously described modified axle 14 as the axle closest to the prime mover which would then be followed by axle 12 (as the center axle) and axle 14 as the axle furthest removed from the prime mover.

It should also be understood that in addition to lubricating only the axle differential (such as differential 72a of axle 14 in FIG. 3) and the axle and remote interaxle lubrication system (shown in axle 12 in FIG. 2), if so desired, the lubrication system could be utilized for solely lubricating a remote interaxle differential (interaxle differential 18 shown in FIG. 2).

From the foregoing, it is believed that those familiar with the art will readily recognize and appreciate the novel concepts and features of the present invention. Obviously, while the invention has been described in relation to only a limited number of embodiments, numerous variations, changes and substitutions and equivalents will present themselves to persons skilled in the art and may be made without necessarily departing from the scope and principles of this invention. As a result, the embodiments described herein are subject to various modifications, changes and the like, without departing from the scope and spirit of the invention, with the scope thereof being determined solely by reference to the claims appended hereto.

What is claimed is:

1. In an axle assembly of the type having a bevel gear drive, including a pinion gear and a ring gear, and further including an axle differential attached to said ring gear and rotatable about the axis of rotation of said ring gear, said axle differential including a generally closed differential carrier housing, a cross disposed within said carrier housing and connected for rotation with the carrier housing, a planetary gear carried by said cross, a pair of coaxial side gears on opposite sides of said cross rotatable about the ring gear axis of rotation and in mesh with said planetary gear, and a pair of coaxial oppositely projecting axle shafts each operatively connected with one of said side gears for conjoint rotation therewith; an axle housing containing and journalling said gear drive and axle differential and providing a lubricant sump below said gear drive, with said bevel pinion and ring gears rotating through the lubricant within said sump and a lubricant system for said axle differential which differential is located entirely above the normal lubricant sump level, the improvement characterized in that said lubrication system comprises in combination;

a. a separate lubricant reservoir in said axle housing substantially completely above the lubricant level of said sump with one of said axle shafts projecting through said reservoir and said pinion gear being journalled in said reservoir wall;
  b. first lubricant collection channel means formed in an upper portion of said axle housing and having one end opening near the rotation path of said ring gear and the other end opening into said reservoir;
  c. second lubricant collection channel means formed in another upper portion of said axle housing and having one end opening near the rotation path of said pinion gear and the other end opening into said reservoir;
  d. said one axle shaft that projects through said reservoir being substantially below the top of said reservoir and being in substantial sealing relationship with said reservoir toward the hub end of said one axle shaft at its exit area from said reservoir; and
  e. lubricant delivery passage means from said reservoir for said axle differential having one end opening into said reservoir at the entrance area of said one axle shaft into said reservoir and the other end opening into said differential, thereby permitting lubrication of said axle differential while being located entirely above said axle sump lubricant level.

2. The improvement according to claim 1 wherein said first and second lubricant collection channel means include first and second stripper edges closely adjacent to the rotating gear teeth of said ring and pinion gears respectively, said stripper edges being adapted to strip lubricant from said gear teeth so as to flow into said channel means.

3. The improvement according to claim 2 wherein said first and second lubricant channel means are substantially downwardly converging from said first and second stripper edges respectively, and terminate into a top portion of said reservoir, said channel means being adapted for gravity channelling said stripped lubricant into said reservoir.

4. The improvement according to claim 1 wherein said lubricating passage means for said axle differential includes a passageway between the outer surface of the said one axle shaft and the inner surface of said differential carrier housing adjacent thereto.

5. The axle assembly of claim 1 wherein said bevel gear drive is hypoid bevel gear drive having the center line of the hypoid pinion gear vertically offset a predetermined distance from the axis of rotation of the hypoid ring gear.

6. The axle assembly of claim 5 further including an interaxle differential housing attached to said axle housing and containing an interaxle differential for distributing torque from a prime mover, said interaxle differential being rotatable about the axis of rotation of said hypoid pinion gear and including a generally closed differential carrier housing, a cross disposed within said carrier housing and connected for rotation with said carrier housing, a planetary gear carried by said cross, a pair of coaxial side gears on opposite sides of said cross rotatable about the hypoid pinion gear axis of rotation and in mesh with said planetary gear, said side gear closest to said axle housing being operatively interconnected with said hypoid pinion gear via a hypoid pinion gear shaft extending through said pinion gear for conjoint rotation therewith, said side gear remote from said axle housing being operatively interconnected with an output shaft, said output shaft being concentric with and passing freely through said hollow hypoid pinion gear shaft, wherein said improved lubrication system further includes:

a. said output shaft projecting through said reservoir free from interference with said one axle shaft by reason of the vertical offset between said hypoid ring and pinion gears, said output shaft being in substantial sealing relationship with said reservoir furthest from said prime mover at its exit area from said reservoir; and
  b. lubricating passage means for said interaxle differential leading from said reservoir into said interaxle differential and commencing in the entrance area of said output shaft into said reservoir and extending between said output shaft and said hollow hypoid pinion gear shaft into said interaxle differential, said lubricant flow into said interaxle differential being solely by gravity pressure and permitting the lubrication of said interaxle differential although it is wholly remote from said axle sump.

7. In a tandem axle assembly wherein the axle assembly closest to the prime mover, is of the type having a hypoid bevel gear drive in which the hypoid pinion gear is hollow and is vertically offset a predetermined distance from the axis rotation of the hypoid ring gear, said assembly including an axle housing, an interaxle differential housing attached to said axle housing, and containing an interaxle differential for distributing the torque from said prime mover, said interaxle differential being rotatable about the axis of rotation of said hypoid pinion gear and including a generally closed differential carrier housing, a cross disposed within said carrier housing and connected for rotation with said carrier housing, a planetary gear carried by said cross, a pair of coaxial side gears on opposite sides of said cross rotatable about the hollow hypoid pinion gear axis of rotation and in mesh with said planetary gear, said side gear closest to said axle housing being operatively interconnected with said hollow hypoid pinion gear via a hollow hypoid pinion gear shaft for conjoint rotation therewith, said side gear remote from said axle housing being operatively interconnected with an output shaft, said output shaft being concentric with and passing freely through said hollow hypoid pinion gear shaft; said axle assembly further including an axle differential attached to said ring gear and rotatable about the axis of rotation of said ring gear, said axle differential including a generally closed axle differential carrier housing, a cross disposed within said carrier housing and connected for rotation with the carrier housing, a planetary gear carried by said cross, a pair of coaxial side gears on opposite sides of said cross rotatable about the ring gear axis of rotation and in mesh with said planetary gear, and a pair of coaxial oppositely projecting axle shafts each operatively connected with one of said side gears for conjoint rotation therewith; said axle housing containing and journalling said hypoid bevel gear drive and axle differential only and providing a lubricant sump below said hypoid bevel gear drive, with said hypoid pinion and ring gears rotating through the lubricant within said sump and a lubrication system for said interaxle and axle differentials, with said axle differential being located entirely above the normal lubricant sump level, the improvement characterized in that said lubrication system comprises in combination:

a. a separate lubricant reservoir in said axle housing substantially completely above the lubricant level of said sump with one of said axle shafts and said output shaft projecting through said reservoir;

b. first lubricant collection channel means formed in an upper portion of said axle housing and having one end opening near the rotation path of said hypoid ring gear and the other end opening into said reservoir;

c. second lubricant collection channel means formed in another upper portion of said axle housing and having one end opening near the rotation path of said hypoid pinion gear and the other end opening into said reservoir;

d. said one axle shaft that projects through said reservoir being substantially below the top of said reservoir and being in substantial sealing relationship with said reservoir toward the hub end of said one axle shaft at its exit area from said reservoir;

e. said output shaft projecting through said reservoir free from interference with said one axle shaft by reason of the vertical offset between said hypoid ring and pinion gears, said output shaft being in substantial sealing relationship with said reservoir at its exit area from said reservoir furthest from said prime mover;

f. first lubricating passage means for said axle differential leading from said reservoir into said axle differential and commencing in the entrance area of the said one axle shaft into said axle differential and being solely fed by gravity pressure, thereby permitting lubrication of said axle differential even though it is located entirely above the normal axle lubricant sump level; and     g. second lubricating passage means or said interaxle differential leading from said reservoir into said interaxle differential and commencing in the entrance area of said output shaft into said reservoir and extending between said output shaft and said hollow hypoid pinion gear shaft into said interaxle differential, said lubricant flow into said interaxle differential being solely by gravity pressure and permitting the lubrication of said interaxle differential although it is wholly remote of said interaxle differential although it is wholly remote from said axle sump.

8. The improvement according to claim 7 wherein said first and second lubricant collection channel means include first and second stripper edges closely adjacent to the rotating gear teeth of said hypoid ring and pinion gears respectively, said stripper edges being adapted to strip lubricant from said gear teeth so as to flow in said channel means.

9. The improvement according to claim 8 wherein said first and second lubricant channel means are substantially downwardly converging from said first and second stripper edges respectively, and terminate into a top portion of said reservoir, said channel means being adapted for gravity channelling said stripped lubricant into said reservoir.

10. The improvement according to claim 7 wherein said lubricating passage means for said axle differential includes a passageway between the outer surface of the said one axle shaft and the inner surface of said differential carrier housing adjacent thereto.

11. In a multiple axle assembly wherein at least one of the axle assemblies is of the type having a hypoid bevel gear drive in which the hypoid pinion gear is hollow and is vertically offset a predetermined distance from the axis of rotation of the hypoid ring gear, said assembly including an axle housing, an interaxle differential housing attached to said axle housing, and containing an interaxle differential for distributing the torque from said prime mover, said interaxle differential being rotatable about the axis of rotation of said hypoid pinion gear and including a generally closed differential carrier housing, a cross disposed within said carrier housing and connected for rotation with said carrier housing, a planetary gear carried by said cross, a pair of coaxial side gears on opposite sides of said cross rotatable about the hollow hypoid pinion gear axis of rotation and in mesh with said planetary gear, said side gear closest to said axle housing being operatively interconnected with said hollow hypoid pinion gear via a hollow hypoid pinion gear shaft for conjoint rotation therewith, said side gear remote from said axle housing being operatively interconnected with an output shaft, said output shaft being concentric with and passing freely through said hollow hypoid pinion gear shaft; said axle housing containing and journalling said hypoid bevel gear drive and providing a lubricant sump below said hypoid bevel gear drive only, with said hypoid pinion and ring gears rotating through the lubricant within said sump and a lubrication system for said interaxle differential, with said interaxle differential being entirely remote from said axle sump, the improvement characterized in that said lubrication system comprises in combination:

a. a separate lubricate reservoir in said axle housing substantially completely above the lubricant level of said sump with said output shaft projecting through said reservoir;

b. first lubricant collection channel means formed in an upper portion of said axle housing and having one end opening near the rotation path of said hypoid ring gear and the other end opening into said reservoir;

c. second lubricant collection channel means formed in another upper portion of said axle housing and having one end opening near the rotation path of said hypoid pinion gear and the other end opening into said reservoir;

d. said output shaft projecting through said reservoir being substantially below the top of said reservoir and being in substantial sealing relationship with said reservoir at its exit area from said reservoir remote from said prime mover; and e. lubricant delivery passage means for said interaxle differential leading from said reservoir into said interaxle differential and commencing in the entrance area of said output shaft into said reservoir and extending between said output shaft and said hollow hypoid pinion gear shaft into said interaxle differential, said lubricant flow into said interaxle differential being solely by gravity pressure and permitting the lubrication of said interaxle differential although it is wholly remote from said axle sump.

12. The improvement according to claim 11 wherein said first and second lubricant collection channel means include first and second stripper edges closely adjacent to the rotating gear teeth of said hypoid ring and pinion gears respectively said stripper edges being adapted to strip lubricant from said gear teeth so as to flow into said channel means.

13. The improvement according to claim 12 wherein said first and second lubricant channel means are substantially downwardly converging from said first and second stripper edges respectively, and terminate into a top portion of said reservoir, said channel means being adapted for gravity chanelling said stripped lubricant into said reservoir.

14. In a multiple axle assembly wherein at least one of said axle assemblies is of the type having a hypoid bevel gear drive in which the hypoid pinion gear is hollow and is vertically offset a predetermined distance from the axis of rotation of the hypoid ring gear, said assembly including an axle housing, an interaxle differential housing attached to said axle housing, and containing an interaxle differential for distributing the torque from said prime mover, said interaxle differential being rotatable about the axis of rotation of said hypoid pinion gear and including a generally closed differential carrier housing, a cross disposed within said carrier housing and connected for rotation with said carrier housing, a planetary gear carried by said cross, a pair of coaxial side gears on opposite sides of said cross rotatable about the hollow hypoid pinion gear axis of rotation and in mesh with said planetary gear, said side gear closest to said axle housing being operatively interconnected with said hollow hypoid pinion gear via a hollow hypoid pinion gear shaft for conjoint rotation therewith, said side gear remote from said axle housing being operatively interconnected with an output shaft, said output shaft being concentric with and passing freely through said hollow hypoid pinion gear shaft; said axle assembly further including an axle differential attached to said ring gear and rotatable about the axis of rotation said ring gear, said axle differential including a generally closed axle differential carrier housing, a cross disposed within said carrier housing and connected for rotation with the carrier housing, a planetary gear carried by said cross, a pair of coaxial side gears on opposite sides of said rotatable about the ring gear axis of rotation and in mesh with said planetary gear, and a pair of coaxial oppositely projecting axle shafts each operatively connected with one of said side gears for conjoint rotation therewith; said axle housing containing and journalling said hypoid bevel gear drive and axle differential only and providing a lubricant sump below said hypoid bevel gear drive, with said hypoid pinion and ring gears rotating through the lubricant within said sump and a lubrication system for said interaxle and axle differentials, with said axle differential being located entirely above the normal axle sump lubricant level, the improvement characterized in that said lubrication system comprises in combination:

a. a separate lubricant reservoir in said axle housing substantially completely above the lubricant level of said sump with one of said axle shafts and said output shaft projecting through said reservoir;

b. first lubricant collection channel means formed in an upper portion of said axle housing and having one end opening near the rotation path of said hypoid ring gear and the other end opening into said reservoir;

c. second lubricant collection channel means formed in another upper portion of said axle housing and having one end opening near the rotation path of said hypoid pinion gear and the other end opening into said reservoir;

d. said output shaft projecting through said reservoir being substantially below the top of said reservoir and being in substantial sealing realtionship with said reservoir at its exit area from said reservoir remote from said prime mover; and e. lubricating passage means for said interaxle differential leasing from said reservoir into said interaxle differential and commencing in the entrance area of said output shaft into said reservoir and extending between said output shaft and said hollow hypoid pinion gear shaft into said interaxle differential, said lubricant flow into said interaxle differential being solely by gravity pressure and permitting the lubrication of said interaxle differential although it is wholly remote from said axle sump.

15. The improvement according to claim 14 wherein:

a. said one axle shaft that projects through said reservoir is below the top of said reservoir and is in substantial sealing relationship with said reservoir at its exit area from said reservoir toward its hub end, said one axle shaft being free from interference with said output shaft by reason of the vertical offset between said hypoid ring and pinion gears; and b. lubricant delivery passage means from said reservoir for said axle differential having one end opening into said reservoir at the entrance area of said one axle shaft into said reservoir and the other end opening into said differential, thereby permitting lubrication of said axle differential while being located entirely above said axle sump lubricant level.

16. The improvement according to claim 15 wherein said lubricating passage means for said axle differential includes a passageway between the outer surface of the said one axle shaft and the inner surface of said differential carrier housing adjacent thereto.

17. The improvement according to claim 14 wherein said first and second lubricant collection channel means include first and second stripper edges closely adjacent to the rotating gear teeth of said hypoid ring and pinion gears respectively, said stripper edges being adapted to strip lubricant from said gear teeth so as to flow into said channel means.

18. The improvement according to claim 17 wherein said first and second lubricant channel means are substantially downwardly converging from said first and second stripper edges respectively, and terminate into a top portion of said reservoir, said channel means being adapted for gravity channelling said stripped lubricant into said reservoir.

* * * * *